Nov. 13, 1962  E. DE GRANDPRE  3,063,385
COMBINATION ROAD AND RAILWAY VEHICLE
Original Filed July 10, 1958  10 Sheets-Sheet 1
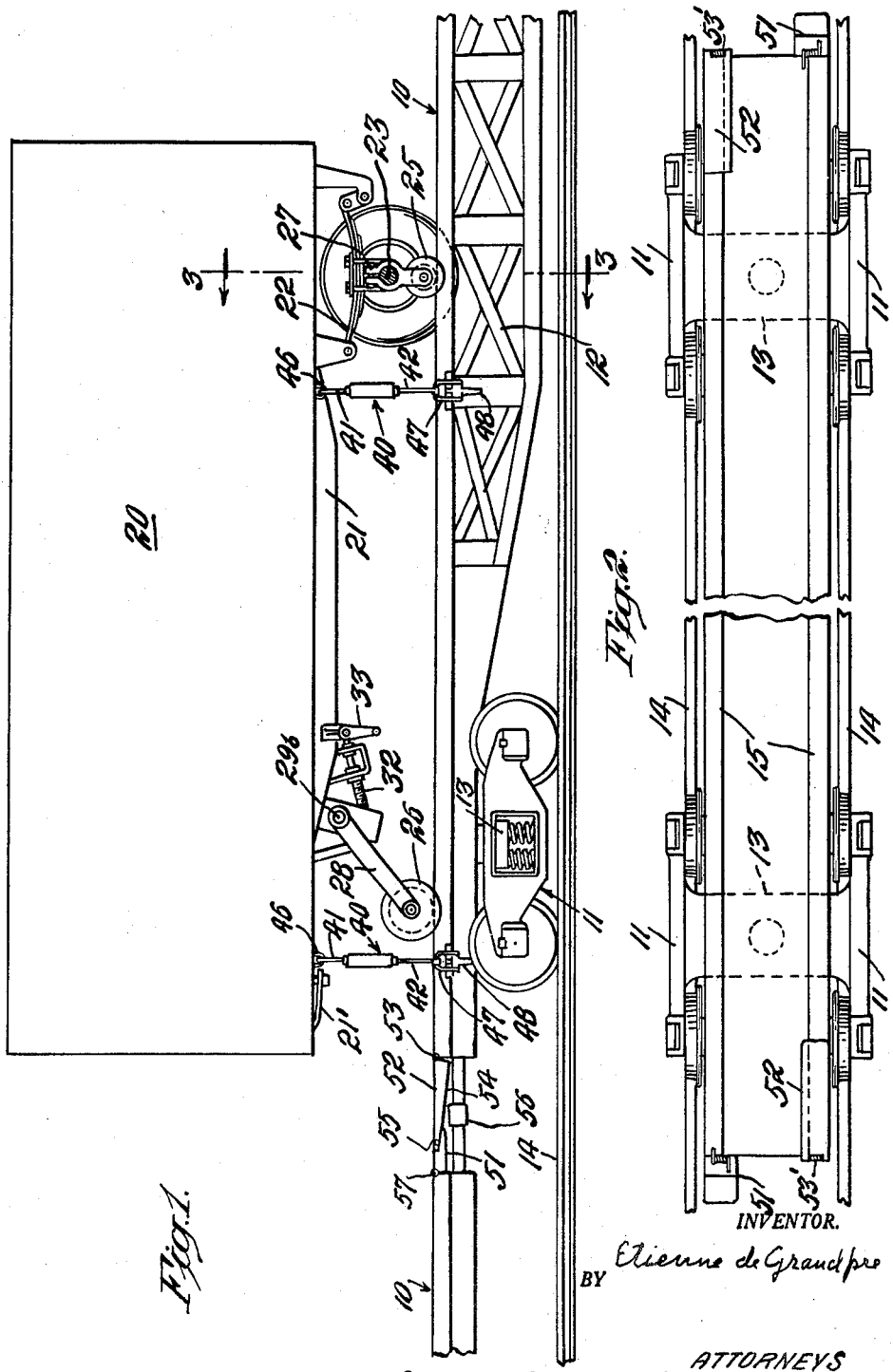
INVENTOR.
Etienne de Grandpre
BY
Prangley, Baird, Clayton, Miller & Vogel.
ATTORNEYS

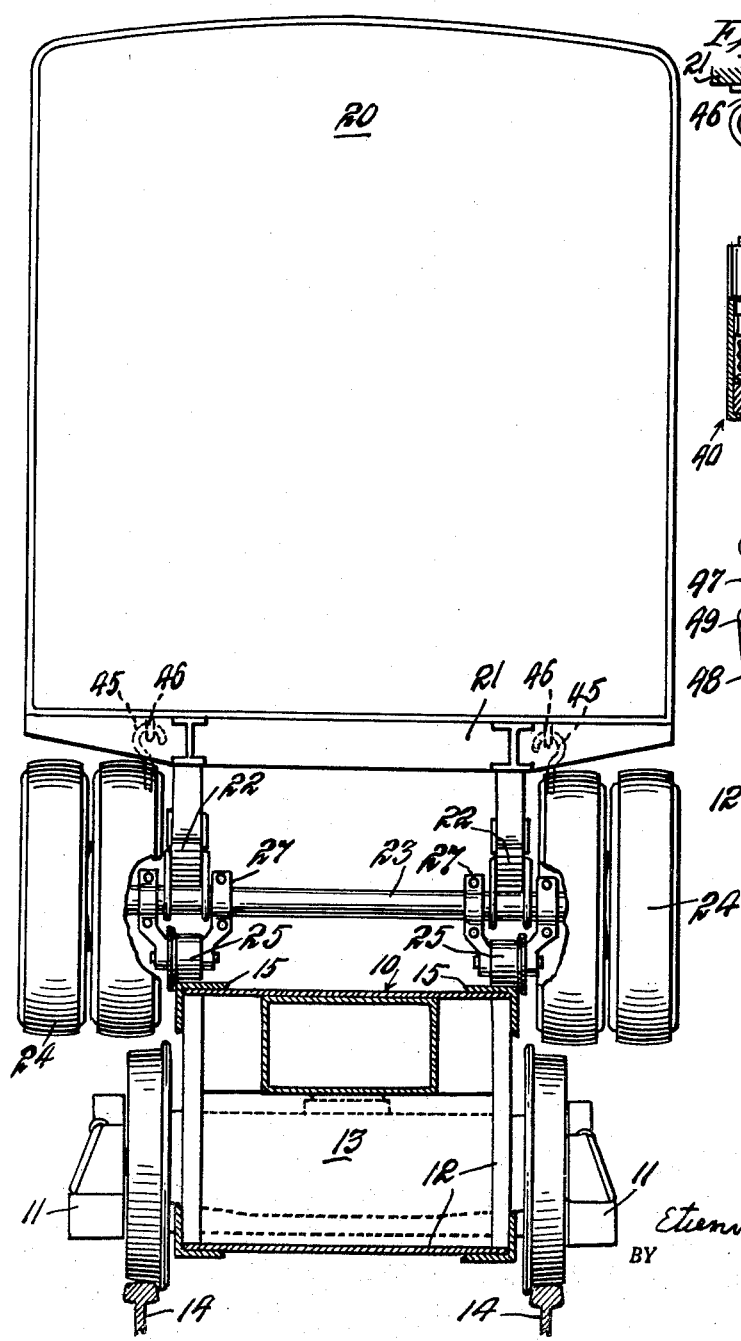

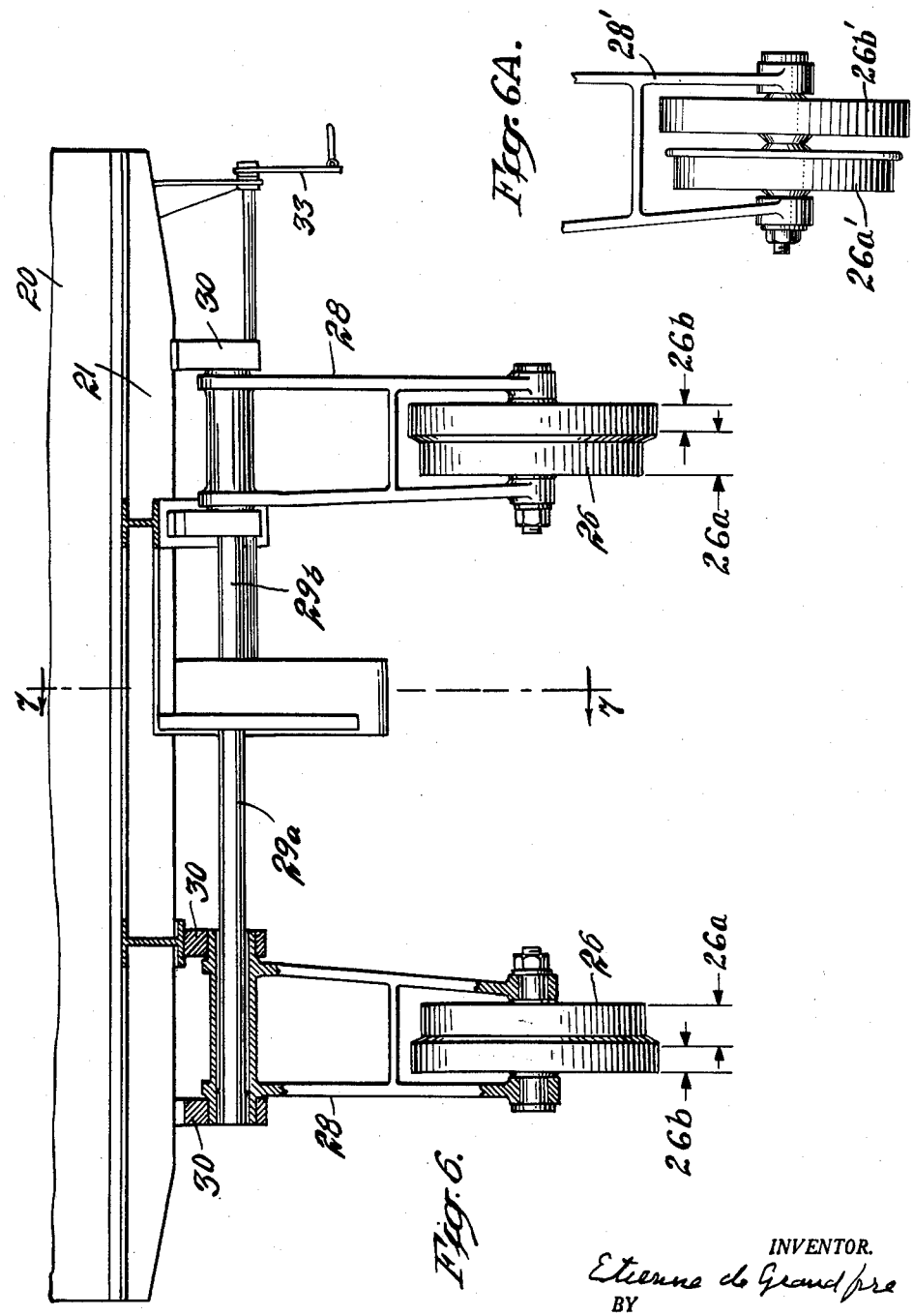

Nov. 13, 1962  E. DE GRANDPRE  3,063,385
COMBINATION ROAD AND RAILWAY VEHICLE
Original Filed July 10, 1958  10 Sheets-Sheet 4
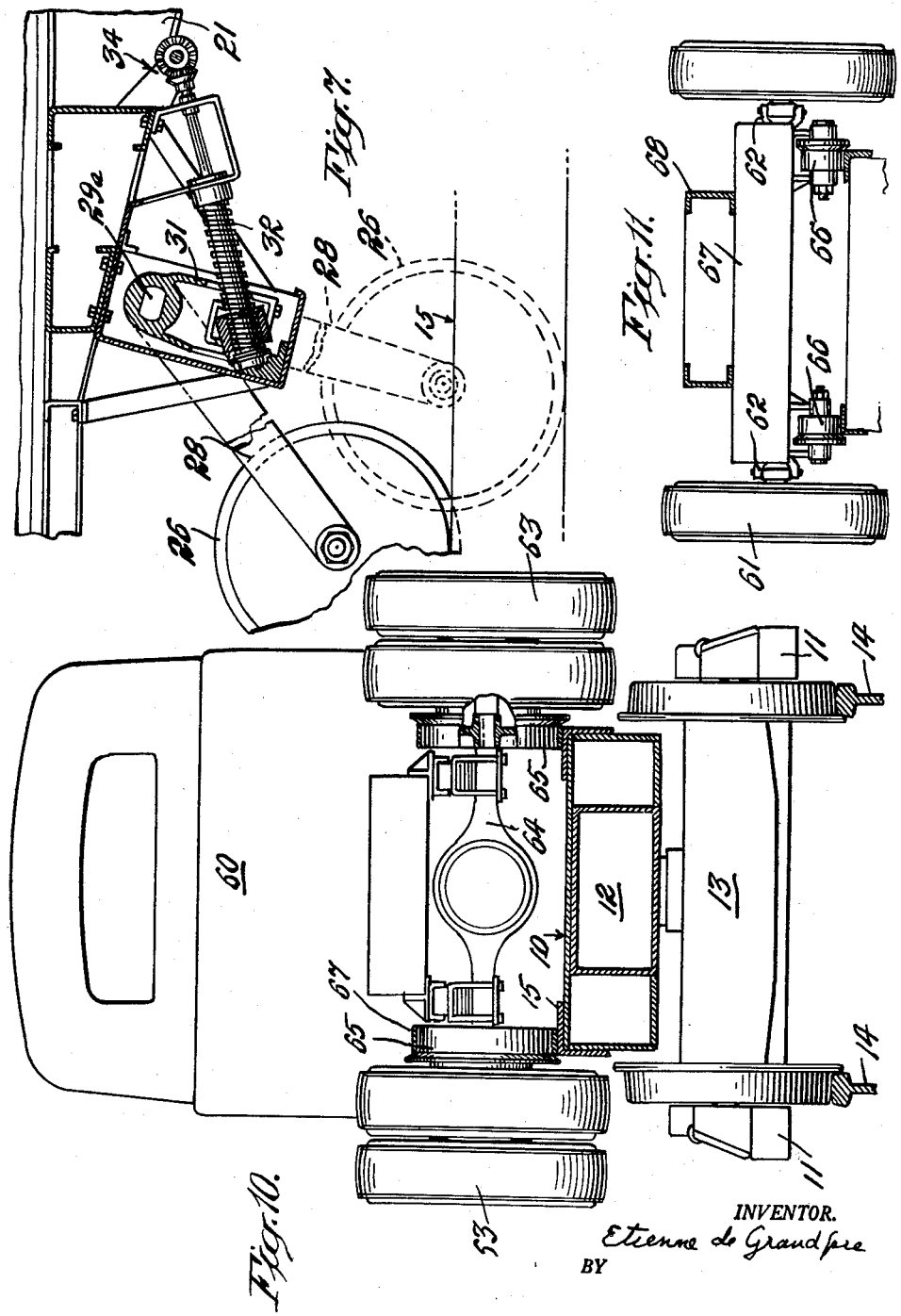
INVENTOR.
Etienne de Grandpre
BY
Brangley, Baird, Clayton, Miller & Vogel
ATTORNEYS Nov. 13, 1962 E. DE GRANDPRE 3,063,385
COMBINATION ROAD AND RAILWAY VEHICLE
Original Filed July 10, 1958 10 Sheets-Sheet 5
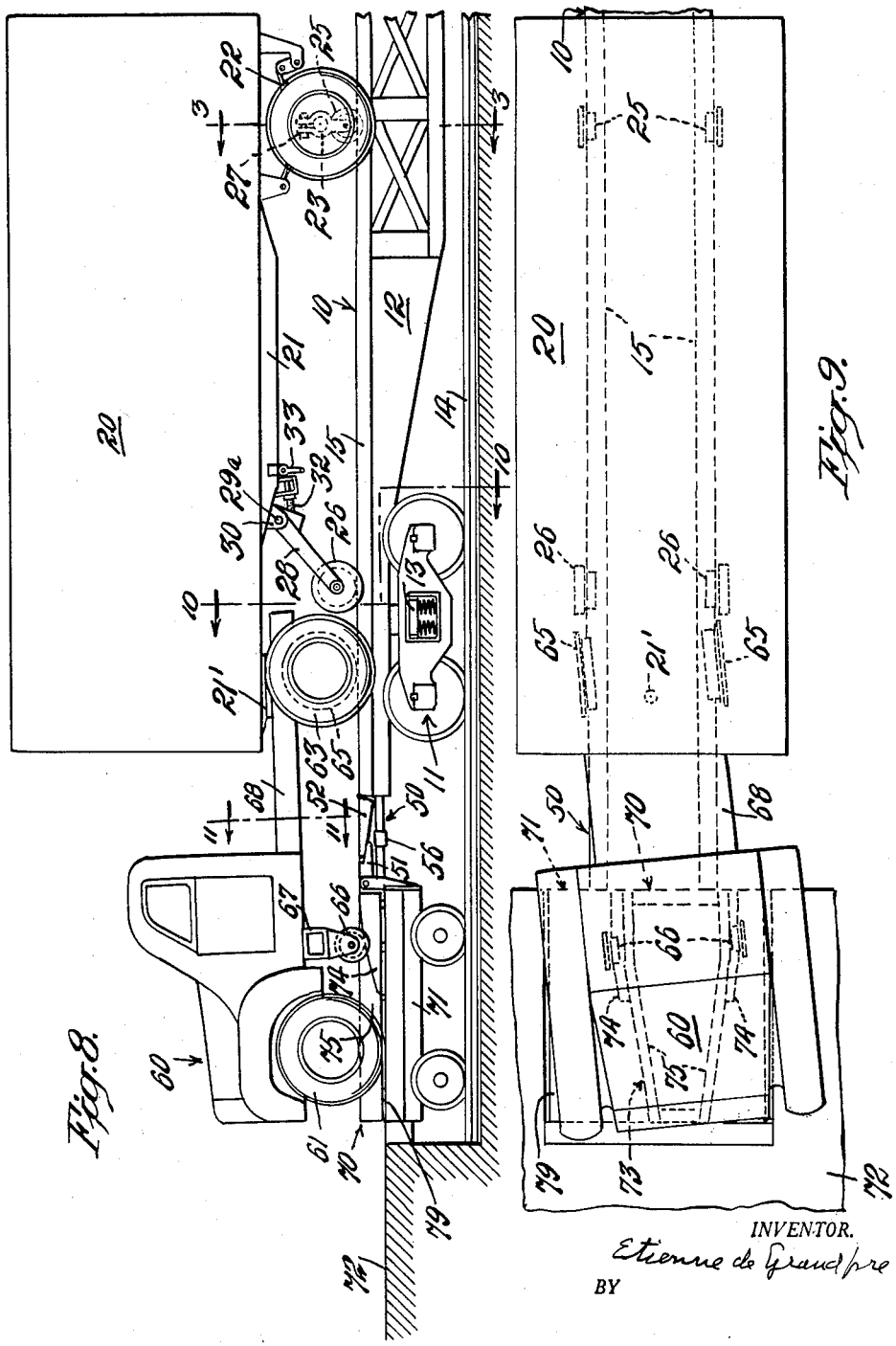
INVENTOR.
Etienne de Grandpre
BY
Prangley, Baird, Clayton, Miller & Vogel
ATTORNEYS Nov. 13, 1962     E. DE GRANDPRE     3,063,385
COMBINATION ROAD AND RAILWAY VEHICLE
Original Filed July 10, 1958     10 Sheets-Sheet 6
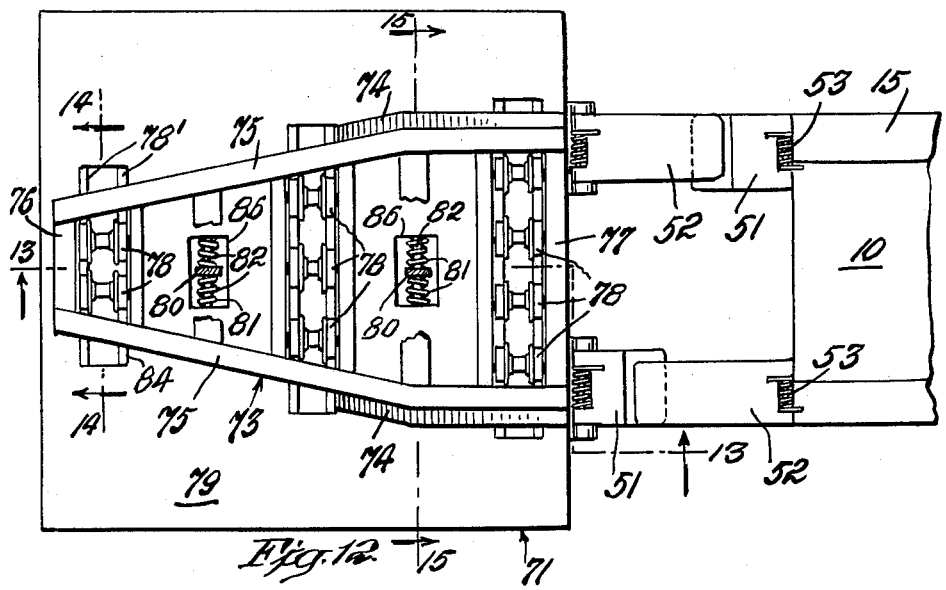
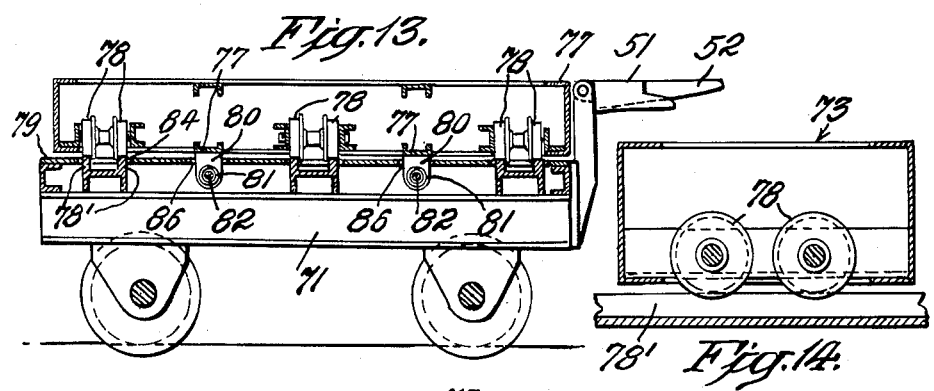
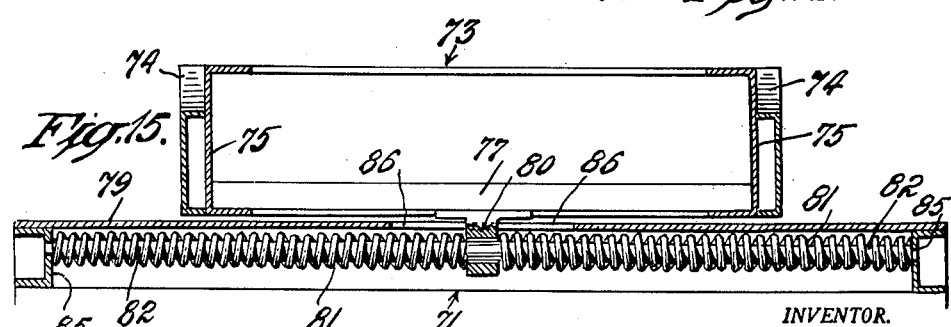

Nov. 13, 1962   E. DE GRANDPRE   3,063,385
COMBINATION ROAD AND RAILWAY VEHICLE
Original Filed July 10, 1958   10 Sheets-Sheet 7
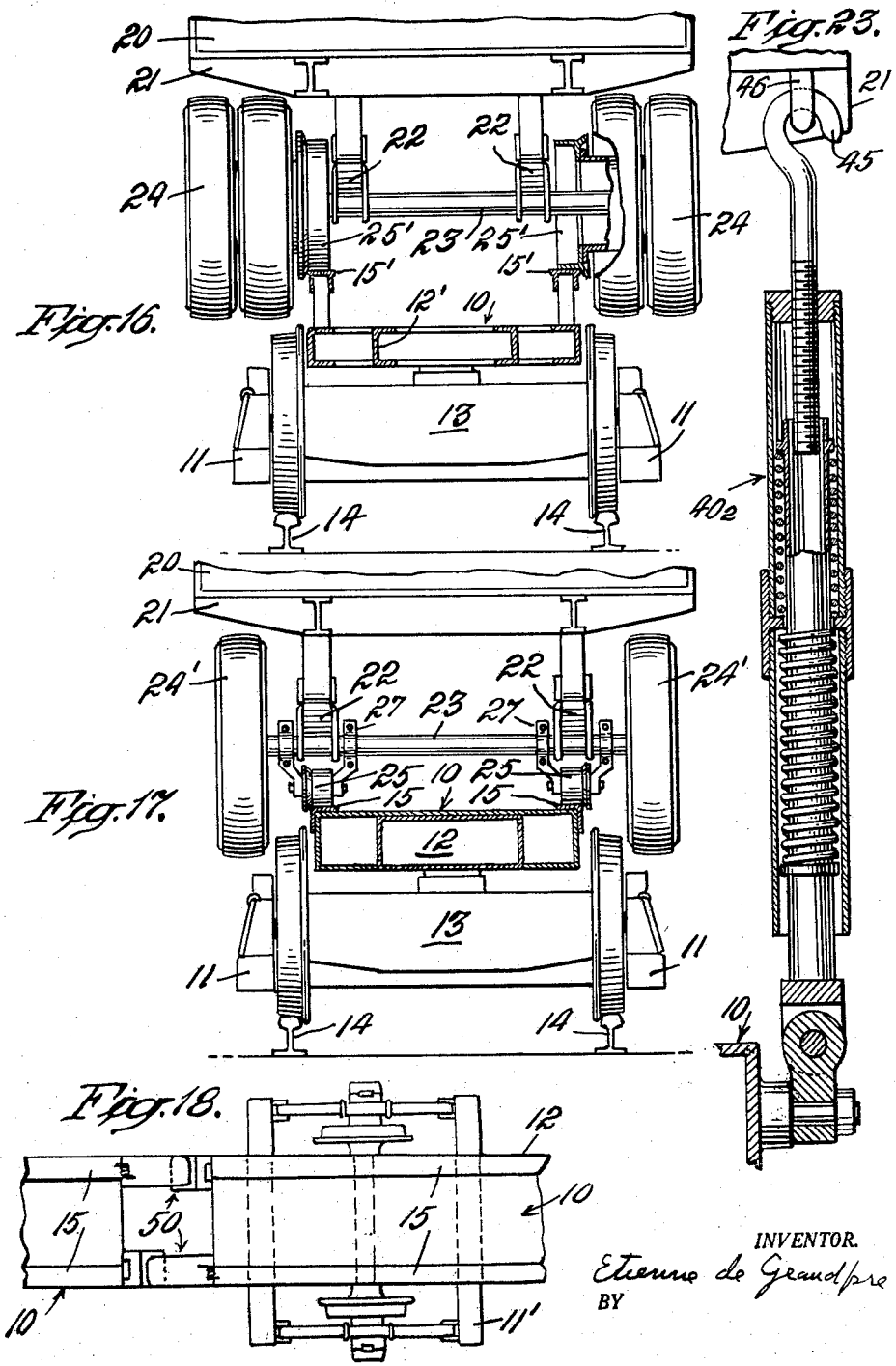
INVENTOR.
Etienne de Grandpre
BY
ATTORNEYS
Prangley, Baird, Clayton, Miller & Vogel

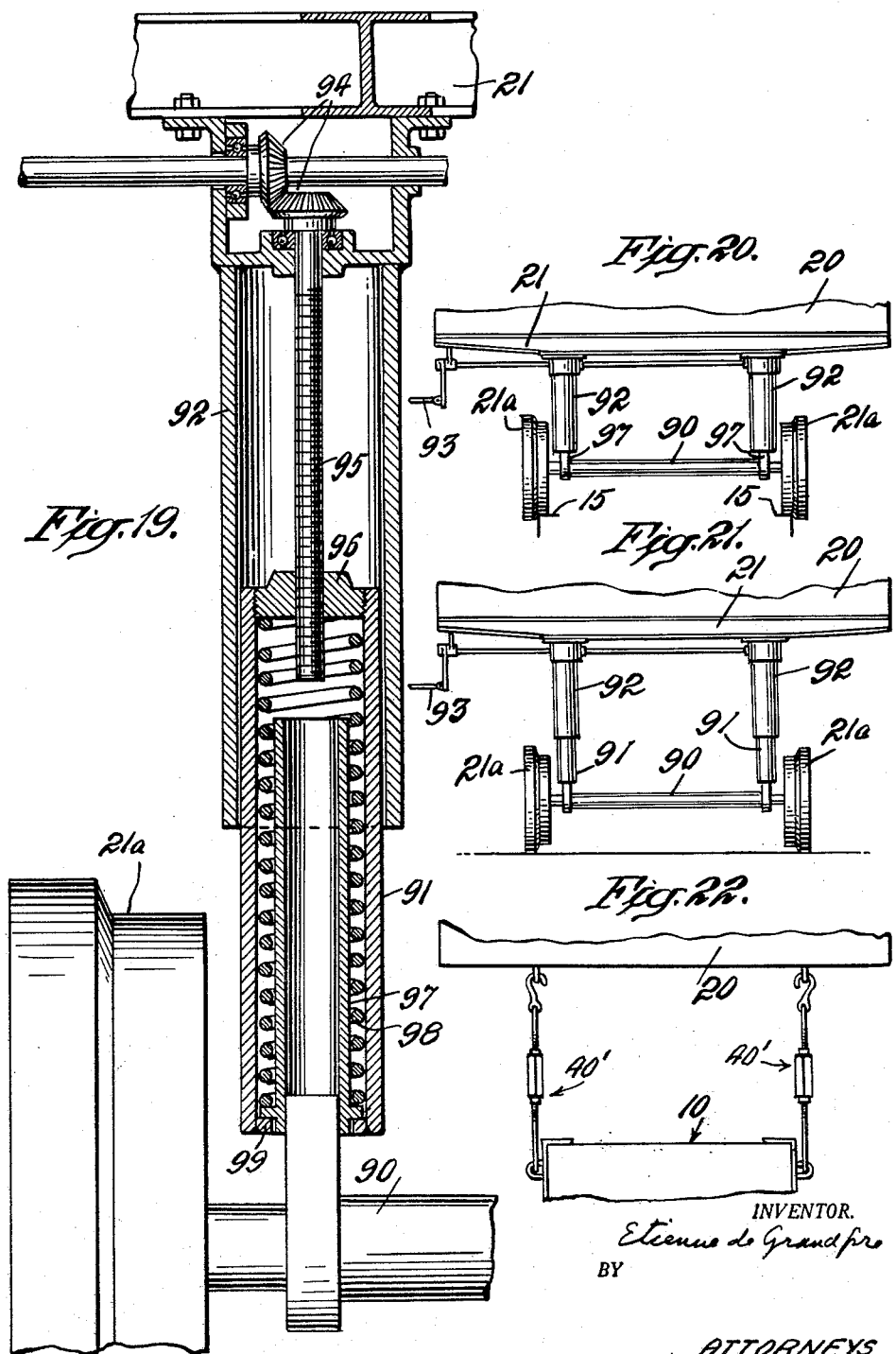

Nov. 13, 1962   E. DE GRANDPRE   3,063,385
COMBINATION ROAD AND RAILWAY VEHICLE
Original Filed July 10, 1958   10 Sheets-Sheet 9
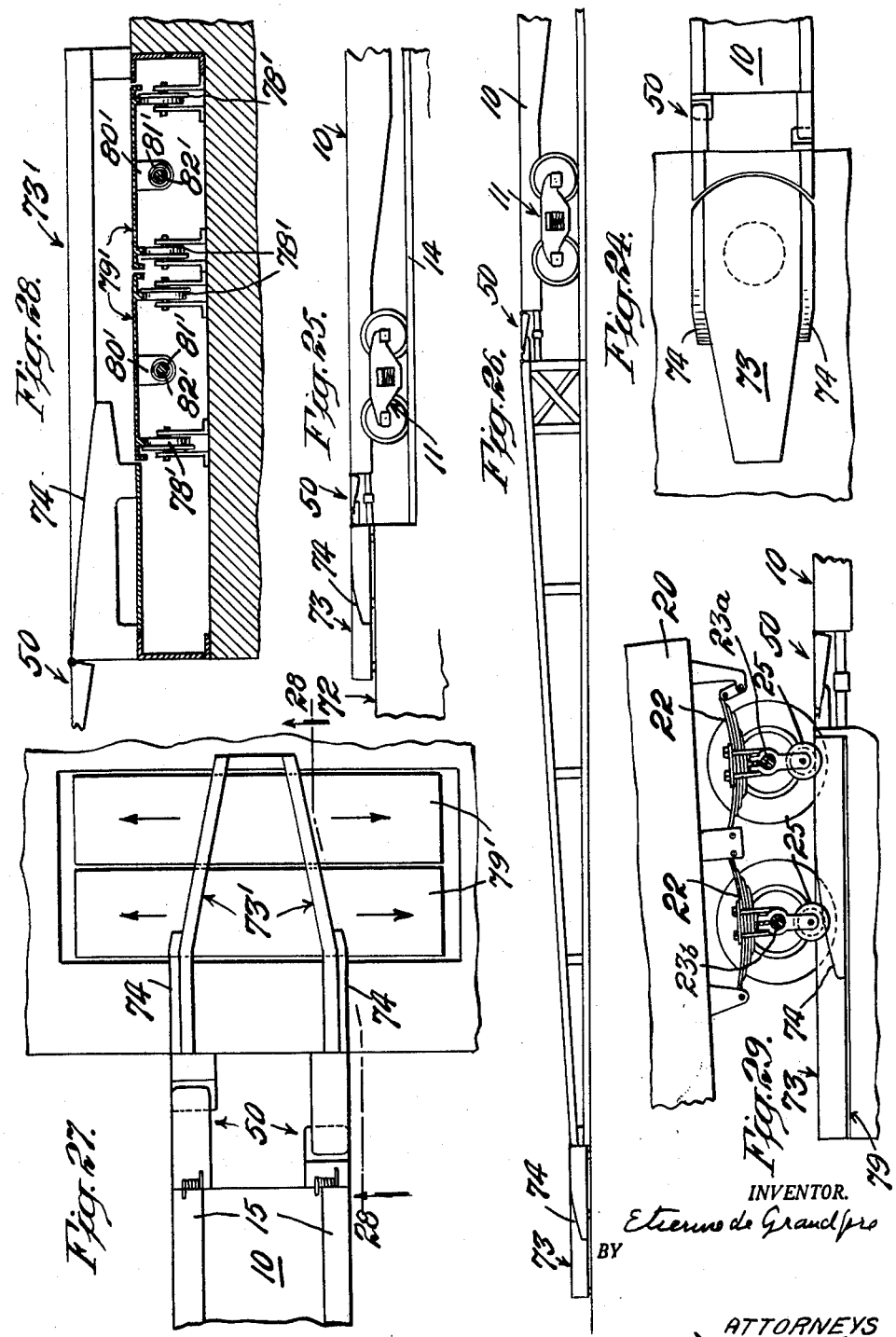
INVENTOR.
Etienne de Grandpre
BY
Prangley Baird, Clayton, Miller & Vogel
ATTORNEYS Nov. 13, 1962  E. DE GRANDPRE  3,063,385
COMBINATION ROAD AND RAILWAY VEHICLE
Original Filed July 10, 1958  10 Sheets-Sheet 10
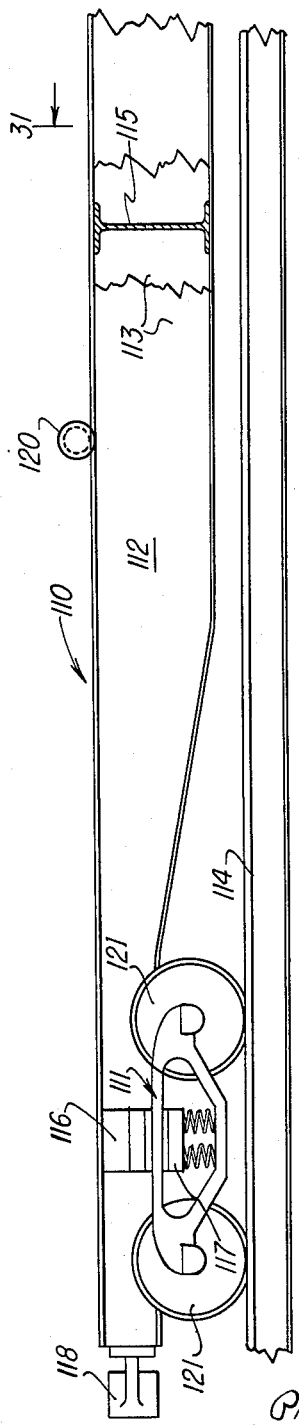
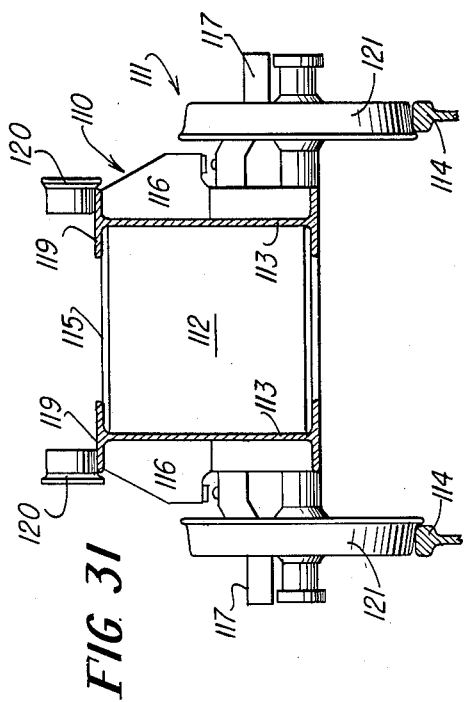
INVENTOR.
Etienne de Grandpre
BY
Prangley, Baird, Clayton, Miller & Vogel
Attys.

United States Patent Office 3,063,385
Patented Nov. 13, 1962

3,063,385
COMBINATION ROAD AND RAILWAY VEHICLE
Etienne de Grandpre, Paris, France, assignor to General American Transportation Corporation, Chicago, Ill., a corporation of New York.
Original application July 10, 1958, Ser. No. 747,724, now Patent No. 3,033,129, dated May 8, 1962. Divided and this application Nov. 21, 1960, Ser. No. 70,546
3 Claims. (Cl. 105—215)

The present invention relates to systems of combined road and railway transportation, and more particularly to improved and simplified combined road and railway vehicles for such combined transportation systems.

This application comprises a division of the copending application of Etienne de Grandpre, Serial No. 747,724, filed July 10, 1958; which last-mentioned application comprises a continuation-in-part of the prior, now abandoned, applications of Etienne de Grandpre, Serial No. 416,631, filed March 16, 1954, Serial No. 416,670, filed March 16, 1954, Serial No. 464,535, filed October 25, 1954 and Serial No. 499,461, filed April 5, 1955.

It is the principal object of the present invention to provide improved and simplified combined road and railway vehicles for use in combined road and railway transportation systems of the type mentioned.

In the system of the present invention, railway flat cars are replaced by a train of railway skeleton cars, which are characterized by the absence of bodies and having only narrow frames lying wholly between the planes of the inner sides of the wheels of their running gears. The upper side edges of the frames serve as an outwardly facing track of narrow gauge for supporting road vehicles or other rolling freight-carrying bodies or containers. The road vehicles have, in addition to their road wheel, inwardly facing flanged wheels mounted between the planes of the inner surfaces of their road wheels and supported on the outwardly facing track provided by the frames of the railway cars.

The system of the present invention thus differs from previous systems of rail-and-road transportation in that the supporting connection between the railroad cars and the road vehicles consists of an outwardly facing narrow-gauge track and inwardly facing narrow-gauge flanged wheels, both located between the planes of the inner sides of the car wheels and between the planes of the inner sides of the road wheels.

This new way of mounting road vehicles or other rolling freight-carrying bodies or containers on these railway skeleton cars produces a number of important advantages:

First: It reduces the weight and cost of the railway rolling stock by providing for cars which consist merely of narrow frames in the form of center sills supported on ordinary railway trucks and having no bodies or other structural parts extending over the wheels of the trucks.

Second: It increases the size of the rolling freight-carrying bodies or containers which may be carried by railway. The absence in the railway skeleton car of parts extending over the car wheels permits the road wheels of the road vehicle to extend downwardly nearly to the upper tangent plane of the wheels of the railway skeleton car or even below this plane when the road wheels are separated more widely than the car wheels. This increases the height of the freight-carrying body of the road vehicle which may be carried with a given railway headroom. Furthermore, the permissible width of the road vehicle bodies is increased by avoiding the use of parts projecting laterally beyond the road wheels, and thus permitting a wider spacing of the road wheels within a specified width limit for road vehicles.

Third: It provides a comparatively narrow supporting connection between the frame of the railway car and the body of the road vehicle permitting the use of ties between the car frame and the vehicle body located outside the track and flanged wheels supporting the body; and, in accordance with my invention, such ties are pivoted to the frame and the body and provide for using the spring suspension of the road vehicle to absorb longitudinal shocks between the vehicle body and the car frame and to restore the road vehicle to its original position after each shock.

Fourth: It facilitates placing the road vehicles on the railway cars by permitting the use of a simple internal triangular centering device for guiding the inwardly facing flanged wheels to the outwardly facing track on the railway train.

Fifth: It cooperates with other features of the system in simplifying the means for moving road vehicles and other rolling freight-carrying containers along the length of a railway train in loading and unloading the vehicles. Because the supporting track is of narrow gauge, the edges of the track are not displaced very far from the axis of the car. As a result, the adjacent ends of the tracks on two adjacent coupled cars have rather short approaching and separating movements when the train rounds a curve on its track. This makes it easy to bridge the track between cars by means of small projections at the corners of the car frames which have only a short sliding movement on each other. To provide for moving trailers across these track bridges in loading and unloading, the system includes tractors which, in addition to their road wheels, have inwardly facing flanged wheels which enable them to operate like locomotives without steering on the track provided by the railway cars and the bridges between them, as well as to operate in the ordinary manner as steerable tractors on a road surface. In this way, the new system avoids the need for bridges between the floors of adjacent flat cars which were required in former systems of trailer transportation to support the road wheels of the tractor used in loading the trailers on a railway train. It also avoids the need of a ramp wide enough to support the tractor's road wheels.

Other objects and advantages of my invention will be pointed out in connection with a description of an illustrative system embodying the invention, and including the following cooperating parts:

(1) A railway skeleton car having a narrow frame supported on railway trucks. The frame is narrower than the gauge of its wheels so that its sides lie wholly inside the wheels of the car. The frame provides or supports an outwardly facing track of a gauge much narrower than the gauge of the car wheels.

(2) A rolling freight-carrying body or container which (as illustrated) takes the form of a trailer similar to the trailer part of an ordinary semi-trailer road truck with spring-mounted rear wheels and a front platform mountable on a tractor. In addition, the trailer has a pair of inwardly facing flanged wheels mounted on its rear axle. The gauge of the pair of flanged wheels is the same as that of the outwardly facing track on the railway car. The lower tangents of the flanged wheels lie above the lower tangents of the road wheels. The trailer also has a pair of inwardly facing flanged wheels near its front end. These may be moved up and down like the dolly wheels of an ordinary trailer. When these wheels are in an upper position, their lower tangents lie on a level with the lower tangents of the rear flanged wheels, and in that position they are resiliently connected to the trailer body.

(3) Tension ties for connecting each trailer body with the frame of the railway car on whose track its flanged wheels are supported. The ends of the ties are pivotally attached at points of the trailer body and car frame which are outside the track on the car.

(The apparatus thus far described provides a transportation unit consisting of a railway car and a trailer. The remaining parts of the system are required for moving trailers onto and off a train of railway cars.)

(4) Bridges between the ends of the tracks on the railway cars so that the train may provide a continuous supporting track. The bridges consist of short projections at two opposite corners of each car frame and longer pivoted projections at the other two corners. The bridges may be narrow—of no greater width than required to support the flanged wheels on the trailers.

(5) Tractors like the tractor part of an ordinary semi-trailer road truck. The tractors are provided with pairs of inwardly facing flanged wheels to enable them to operate on the track and track bridges carried by the railroad train. The flanged wheels are mounted on fixed transverse axes and one pair of them is driven by the engine of the tractor so that the tractor may operate on the track and bridges without steering like a locomotive.

(6) A centering device at one end of the track on the railway train. The centering device consists of a guiding member having a form approximating an isosceles triangle. In its normal position, the axis of the guiding member is coincident with the axis of the track and its base is at the end of the track. The point of the guiding member is movable out of central position and the guiding member is provided with resilient means which tends to restore it to its normal central position. The guiding member is placed over a flat surface which can support the road wheels of a truck. Along its side edges, the guiding member has inclined track surfaces.

In using the apparatus which has been described in loading a trailer on a railroad train, the trailer is attached to a tractor and is backed towards the end of the train over the centering device. The centering device engages the pairs of flanged wheels of the trailer and tractor successively, aligning the entire vehicle with the track on the train as it is moved upon it. The tractor is then operated like a locomotive without steering to move the trailer to the point of the train at which it is to be carried. The trailer is then disconnected from the tractor in the ordinary manner so that the trailer remains supported on the track by its flanged rear wheels and its flanged dolly wheels. The tractor may then be driven along and off the track, again being operated without steering like a locomotive.

In the accompanying drawings, I have illustrated the construction of the system which I consider most desirable and also some modified or alternative constructions. In the drawings:

FIG. 1 is a side view of a railway unit consisting of a trailer mounted on and secured to a railway car, omitting the road wheels on the side towards the observer;

FIG. 2 is a top view of the railway car;

FIG. 3 is an enlarged transverse section of the unit shown in FIG. 1 taken on the line 3—3 of that figure;

FIGS. 4 and 5 are detailed views of the ties between the trailer body and the railway car frame shown in FIG. 1;

FIG. 6 is a partial enlarged end elevation of the trailer with parts in section, showing the mounting of the front wheels;

FIG. 6A is a fragmentary end elevational view of a modified form of the right-hand side of the front wheel mounting arrangement of FIG. 6;

FIG. 7 is a section on the line 7—7 of FIG. 6;

FIG. 8 illustrates the loading of a trailer on a railway car and shows in side elevation a transportation system including a trailer and a tractor for moving the trailer, a railway car, and a centering device mounted upon a mobile support in the form of a railway flat car;

FIG. 9 is a top view of the system shown in FIG. 8;

FIG. 10 is a transverse section taken on the line 10—10 of FIG. 8 showing the driving wheels of the tractor;

FIG. 11 is a partial transverse section on the line 11—11 of FIG. 8 showing the front wheels of the tractor;

FIG. 12 is an enlarged top view of the centering device shown in FIG. 8;

FIG. 13 is a section of the centering device on the line 13—13 of FIG. 12;

FIG. 14 is a section on the line 14—14 of FIG. 12;

FIG. 15 is a transverse section of the centering device on the line 15—15 of FIG. 12;

FIG. 16 is a transverse section of a railway unit similar to FIG. 3, showing rails mounted on the railway car frame and flanged rear wheels coaxial with the rear axle of the trailer;

FIG. 17 is a transverse section similar to FIG. 3 showing a lower car frame which places the treads of the road wheels below the tops of the car wheels;

FIG. 18 is a partial plan view of the top of a railway car having a two-wheeled truck instead of the four-wheeled truck shown in FIG. 2;

FIGS. 19, 20 and 21 show a modified mounting of the flanged front wheels of the trailer which may be substituted for the mounting shown in FIGS. 6 and 7, FIG. 19 being a fragmentary transverse section, and FIGS. 20 and 21 front end views showing the wheels in their up and down positions, respectively;

FIG. 22 is a partial transverse section of a railway unit such as shown in FIGS. 1 and 3 showing the substitution of inextensible ties for the ties shown in FIGS. 1, 4 and 5;

FIG. 23 shows a tie more resilient than that shown in FIGS. 4 and 5;

FIG. 24 is a top view of a centering device in which the guide is pivoted at its read end;

FIG. 25 is a side view, partially in section, showing the centering device mounted on a stationary support in the form of a platform disposed above ground level;

FIG. 26 is a side view showing the centering device mounted on a stationary support disposed at ground level and inclined tracks connecting it with the track on the railway car;

FIG. 27 is a top view of a centering device having a fixed guide and a slidable platform;

FIG. 28 is a section on the line 28—28 of FIG. 27;

FIG. 29 is a partial side elevation, partly in section, showing a trailer with two rear axles on a centering device, omitting the road wheels on the side towards the observer;

FIG. 30 is an enlarged fragmentary side elevational view of a modified form of the railway car; and FIG. 31 is a further enlarged lateral sectional view of the railway car, taken in the direction of the arrows along the line 31—31 in FIG. 30.

Referring now to FIGS. 1, 2 and 3 of the drawings, the system of freight transportation there illustrated, and embodying the features of the present invention, essentially comprises a railway skeleton car 10 and a rolling freight-carrying body or container 20 in the form of a road vehicle, and specifically in the form of a highway trailer.

The railway car 10 has two four-wheeled railway trucks 11 of ordinary construction and a frame 12 in the form of a fabricated beam or center sill which is supported near each of its ends on the bolster 13 of one of the trucks 11. As shown in FIGS. 2 and 3, the frame 12 of the railway car is narrower than the gauge of the railway track 14 on which the wheels of the car operate. As best shown in FIG. 3, the upper side edges of the frame 12, consisting of angle irons 15, form an outwardly facing track capable of supporting and guiding a pair of inwardly facing flanged wheels.

The trailer 20 has a chassis and body 21 of ordinary construction. Its rear end is mounted by a spring suspension 22 on a rear axle 23 which carries the usual road wheels 24 having pneumatic tires. The usual double wheels may be used as shown in FIG. 3. At the front end is the usual king pin structure 21′ for mounting on a tractor.

To enable the trailer 20 to run on, and be supported by, the upper side edges of the car frame 12, the trailer is provided with two pairs of inwardly facing flanged wheels 25 and 26. The flanged wheels or rollers 25 are mounted in U-shaped frames 27 bolted on the rear axle 23. These wheels may thus easily be applied to existing trailers and, when applied as indicated, support the rear end of the trailer through the trailer spring suspension 22. The wheels 25 are sufficiently far above the tread surfaces of the road wheels 24 not to interfere with operation of the trailer on the road.

Front flanged wheels 26 serve not only to support the front end of the trailer on the railway car as shown in FIG. 1 but also to replace the dolly wheels ordinarily used to support the front end of a trailer on the ground when it is disconnected from a tractor. Thus, as shown in FIG. 6, each of the wheels 26 comprises an inner section 26a constituting a flanged roller for rail-type operation upon a track element 15 carried by the upper side edge of the car frame 12 and an outer section 26b constituting a supporting wheel for road-type operation upon a roadway; and while the two sections 26a and 26b of each wheel 26 are preferably formed integral with each other, they may be separately formed if desired.. Like ordinary dolly wheels, the flanged wheels 26 are mounted so that they may be moved between a down position in which their lower edges are in the same horizontal plane as the treads of the rear road wheels 24 of the trailer and an up position in which they are raised sufficiently to be out of the way in road operation of the trailer when attached to a tractor. Hence, the front landing gear of the trailer 20 carries the pair of front supporting wheels 26b and the pair of front flanged rollers 26a, the front flanged rollers 26a being located between the front supporting wheels 26b and disposed above the plane of the bottom surfaces of the front supporting wheels 26b.

Furthermore, as illustrated in FIG. 6A, in the front landing gear, the front flanged rollers 26a' may be constructed separate and distinct from the front supporting wheels 26b', as noted above.

The mechanism for moving the wheels 26 up and down is so arranged that when the wheels are in their up position, they are on the same horizontal plane as the flanged wheels 25 so that they may cooperate with the wheels 25 supporting the trailer in a horizontal position on the frame of a railway car as shown in FIG. 1. The mounting of the wheels 26 further differs from the usual dolly wheel mounting in that it provides a resilient connection between the wheels and the body of the trailer when the wheels are in their up position.

The details of the mounting for the wheels 26 are shown in FIGS. 6 and 7. The wheels are rotatably mounted on arms or cranks 28 which are keyed at the outer ends of torsion bars 29a, 29b. Bearings for the arms 28 are provided in hangers 30 depending from the chassis of the trailer. Swinging the arms 28 to move the wheels 26 up and down is obtained by a mechanism connected to an arm 31 which is keyed to the inner ends of the torsion bars 29a, 29b. The arm 31 may be turned by a worm mechanism 32 operable by a handle 33 through beveled gears 34.

When the wheels 26 are to be used to support the front end of the trailer from the ground, the handle 33 is operated to swing the arm 31 and the arms 28 to place the wheels in their down position which is shown in FIG. 6 and in dotted lines in FIG. 7. When the trailer is attached to a tractor for operation on the road, the handle 33 is moved to turn the arm 31 and the cranks 28 to place the wheels 26 in an up position shown in FIG. 1 and in full lines in FIG. 7. In this position of the wheels, the arms 28 are inclined to the vertical at a considerable angle so that when the wheels in their up position are used to support the front end of the trailer upon the frame of a railway car as shown in FIG. 1, the weight of the front end of the trailer produces torsion strain and these provide a resilient mounting of the front end of the trailer on the wheels 26.

The flanged wheels 26 and their mounting may easily be substituted for the usual dolly wheels and dolly-wheel mounting of existing trailers.

To provide a railway unit for transportation, the trailer body is secured to the frame of the railway car by vertical tension ties 40 located outside the track formed by the frame. There is at least one of these ties at each side of the unit, and more desirably two at each side as indicated in FIG. 1. They have a pivotal attachment at each end.

A desirable form of the ties 40 is shown in FIGS. 4 and 5. Each tie consists of two rods 41, 42 connected by a damping device 43 containing a spring 44. The upper end of the rod 41 is provided with a hook 45 secured in an eye 46 on the chassis 21 of the trailer 20. A number of such eyes are most desirably provided on the trailer chassis so that the position of the ties may easily be adjusted. The lower end of the rod 42 is pivoted to a link 47 secured to a toggle lever 48 pivoted on a pin 49 fixed in one side of the car frame 12. The toggle lever 48 provides an effective and easy means for applying the ties 40 under tension.

The ties 40 secure the trailer body against sideways tipping with respect to the railway car frame. They also check lengthwise movements of the trailer on the railway car in a resilient manner which serves to absorb endwise shocks. When the railway car 10 receives a shock moving it suddenly to the left in FIG. 1, the trailer tends to move to the right on the car. This moves the upper ends of the ties 40 to the right, taking them out of vertical. The lengthwise movement of the trailer on the railway car is resisted and the trailer is returned to its original position after the shock by action of the spring suspension 22 at the rear end of the trailer, the torsion rods 29 of the front wheel mounting and the spring 44 in the ties 40. The flanged wheels may be locked or braked to damp the lengthwise return movement caused by the springs. All these springs act substantially vertically between the trailer body and the railway car frame so that they resist the horizontal movement of the trailer on the railway car frame with a gradually increasing spring force which is effective in absorbing shocks.

In the railway unit shown in FIGS. 1 and 3, the frame 12 of the railway car which provides the track for the flanged wheels of the trailer may be made of such a height that the lower tangent of the road wheels of the trailer is only slightly above the upper tangent of the wheels of the railway car, as shown in FIG. 3. If the trailer is to be carried with its road wheels directly over a pair of the railway car wheels, slightly more clearance than is shown in FIG. 3 should be allowed to permit the action of the truck bolster springs of the railway car. Ordinarily, however, it is possible to place the trailer on the railway car in such manner that its road wheels are not directly over any of the wheels of the railway car. In this case, even less clearance than is shown in FIG. 3 may be allowed, since the road wheels of the trailer are directly over the railway car wheels only during the loading of the trailer on the car when the railway car is, of course, stationary.

In order to provide for loading and unloading the trailers, a train made up of railway cars 10 is provided with track bridges at the ends of the cars which make the outwardly facing tracks formed by the upper edges of the frames 12 continuous throughout the length of the train.

Track bridges 50 are shown in FIGS. 1, 2 and 8 and in detail in FIGS. 12 and 13. Each of the cars 10 has at two diagonally opposite corners of its frame 12 short projections 51 with inclined upper surfaces. Each car has at its other two opposite corners longer pivoted projections 52 with inclined lower surfaces. The longer projections 52 are hinged to the ends of the car frames on horizontal pivots 53 and are urged downwardly so that their inclined lower surfaces 54 ride on the inclined upper surfaces 55 of the opposed short projections 51. Gravity is usually sufficient to keep the longer projections 52 in contact with the shorter projections 51 but it may be supplemented by a spring 53' on the pivot 53. The longer projections 52 have a slight sliding movement on the shorter projections during the approaching and separating movements of the corners of the car frames when the cars are rounding a curve in the track, but this motion is not sufficient to cause a break in the bridges. Consequently the train may, if desired, be stopped on a curved track for loading.

The placing of identical bridge elements at diagonally opposite corners of each railway car causes the bridge elements to cooperate properly even when one car is reversed end for end in making up the train.

The track bridges are located near the ordinary couplers 56 by which the cars are connected. In order to avoid danger to workmen in coupling the cars, both the longer and shorter projections may be made retractable. Each longer projection may be retracted by simply turning it on its pivot 53 to a position in which it is locked against the upper surface of the frame of the car to which it is pivoted. To permit similar retraction of the shorter projections 51, they may be connected to the car frame by hinges 57 similar to the hinges 53, but the inner ends of the projections 51 rest against the ends of the car frames when the projections are turned outwardly, so that the projections are, for practical purposes, fixed when in operative position.

A tractor 60 is provided for moving the trailers along the frames of the railway cars and across the track bridges between the cars. The tractor 60 is shown in FIGS. 8, 9 and 10. It is similar to the tractors used as part of ordinary semi-trailer trucks in that it has front road wheels 61 mounted on steering knuckles 62 and rear traction road wheels 63 mounted on drive shaft 64. The tractor is also provided with two pairs of inwardly facing flanged wheels 65, 66 of the same gauge as the outwardly facing track formed by the upper side edges of the car frame. The flanged wheels are mounted high enough to be out of the way in road operation of the tractor.

The flanged wheels 65 are between the driving road wheels 63 and are mounted on the drive shaft 64 either directly, as shown in FIG. 10, or by attaching them to the driving road wheels. Their tread surfaces are faced with friction material 67 to enable them to grip the tracks and serve as driving wheels. Friction material may also be provided of the tracks formed at the outer edges of the frame 12 on the railway car. The front flanged wheels 66 are mounted on the short girder 67 attached to the lower side of the chassis 68 of the tractor. Thus, they rotate on a fixed transverse axis of the tractor and have no connection with the steering knuckles on which the front road wheels 61 are mounted. The two pairs of flanged wheels may be mounted on an existing tractor without altering its other parts. When the two pairs of flanged wheels are supported by the outwardly facing track formed by the car frames and the bridges, as shown in FIGS. 10 and 11, the tractor may be operated without manual steering.

To enable a semi-trailer truck consisting of the trailer 20 and the tractor 60, which have been described, to get onto the track provided by the frames 12 of the railway cars, a centering device 70 is provided. The centering device 70 may be mounted on a short railway flat car 71 located adjacent to a loading platform 72 at one end of a train consisting of railway cars 10, as shown in FIGS. 8 and 9. The railway flat car 71 has a floor 79 located on a level with the top of the loading platform 72 and below the level of the top edges of the frames of the railway cars. The centering device includes a guide 73 overlying the floor 79. The guide has the general form of an isosceles triangle. Along part of the sides of the guide 73 are inclined tracks 74. The guide 73 is normally located with its side edges at its wider end in line with the tracks and track bridges of the train. The guide is, however, capable of lateral movement and is resiliently urged towards its central normal position.

The construction of the guide 73 and its mounting is shown in FIGS. 12–15. The guide 73 consists of two side bars 75 carrying the inclined rails 74 and secured together by cross bars 76, 77. Between the cross bars 76 are mounted pairs of flanged wheels 78 which project below the side pieces 75 and support the guide on transverse rails 78' on the frame of the railway flat car 71 below slots 84 in the car floor 79. The cross-pieces 77 carry detents 80 which serve as abutments for the inner ends of compression springs 81 mounted on cross-rods 82 under the car floor. The side sills 85 of the frame of the railway flat car 71 provide fixed abutments at the outer ends of these springs. Slots 86 in the car floor 79 are provided for the detents 80.

The cooperation of the parts of the system in loading a trailer on a train is illustrated in FIGS. 8 and 9. As shown in these figures, the trailer and the driving wheels of the tractor are already on the track provided by the frame 12 of the car 10. The front road wheels 61 of the tractor rest upon the floor 79 of the railway flat car 71. The tractor has been backed in at a slight angle to the track provided on the train so that its front flanged wheels have engaged the guide 73 and forced it sideways away from its central position. These flanged wheels are shown mounting the inclines 74 of the guide to a point where they are about to take the weight of the front end of the tractor off its front road wheels 61. As soon as this occurs, the springs 81 force the guide 73, which is now carrying the front end of the tractor, back to its central position and thus aligning the tractor with the track on the train so that the front flanged wheels of the tractor cross the track bridge 50 and engage the outer side edges of the frame 12 of car 10. The tractor 60 may then be operated without steering to move the trailer along the train as far as desired.

While FIGS. 8 and 9 show the operation of the centering device only when it is engaged by the front flanged wheels of the tractor, it should be understood that the centering device operates in the same manner when engaged by each pair of flanged wheels on the truck. Thus, as the truck is backed upon the train the centering device first centers the rear end of the trailer by carrying its rear flanged wheels 25 to a central position; next it centers the front end of the trailer and the rear end of the tractor which are pivoted together by engagement with the front flanged wheels 26 of the trailer and the rear flanged wheels 65 of the tractor; and finally centers the front end of the tractor by engagement with its front flanged wheels 66 as previously described. After the trailer 20 has been placed in a desired position on the train of cars 10, the tractor is disconnected from the trailer so that it may operate on its flanged wheels to move to and off the end of the train. As soon as its flanged wheels descend the inclines 74 of the centering device, its road wheels engage the floor of the car 71 and the platform 72 so that it may be steered and operated as usual upon a road.

While the apparatus illustrated in FIGS. 1 to 15, which has been described, is of the construction which I consider most desirable, it will be apparent to those skilled in the art that many changes of construction of the specific parts of my apparatus may be made without changing the operation of the system. In order to illustrate the scope of my invention, I will describe a few of the possible changes and modifications:

Instead of using the upper side edges 15 of the car frames 12 as the track for supporting the trailers, rails 15' may be provided on these upper edges to serve as the track. This is illustrated in FIG. 16.

Instead of making the frame 12 of the railway car and the frames 27 supporting the flanged wheels 25 of such height that the treads of the traction wheels of the trailer supported on them are above the upper tangent of the wheels of the car as shown in FIG. 3, the frame 12 may be decreased in height or the position of the flanged wheels 25 on the trailer may be raised so that the treads of the road wheels lie on a plane below the upper tangent of the car wheels as shown in FIG. 17. This construction is practicable when the road wheels 24' of the trailer are of a wider gauge than the car wheels as shown in FIG. 17.

Instead of mounting the frames 12 of the railway cars upon the four-wheel trucks 11 ordinarily used in the United States, the frame may be mounted on two-wheel trucks 11' of the type used in Europe, as shown in FIG. 18.

Instead of mounting the front dolly wheels of the trailer on a torsion rod, they may be mounted on compression springs, as shown in FIGS. 19, 20, 21. In this case the wheels 21a are mounted on a cross shaft 90 at the lower end of a tube 91 which telescopes within a tube 92 depending from the chassis of the trailer. A crank 93 operating through beveled gears 94, screw 95, and nut 96 provides for moving the wheels 21a between an up position shown in FIG. 20 and a down position shown in FIG. 21. The mounting is made resilient by providing a tube 97 sliding inside the smaller telescopic tube 91 and a spiral spring 98 reacting between the nut 96 and a collar 99 on the tube 91.

Instead of using either of the mountings described which make the front flanged wheels of the trailer movable so that they may replace the ordinary dolly wheels of the trailer, it is possible to retain the ordinary dolly wheels for supporting the trailer on the ground and to provide raised flanged front wheels for engaging the track. In this case, no vertical adjustment of the flanged wheels is required.

Instead of using the tension ties 40 shown in FIGS. 4 and 5, it is possible to use inextensible tension ties 40' such as those shown in FIG. 22, which consist merely of pieces of wire rope having hooks at their ends and a turnbuckle by which they may be tightened. Rods or chains may be used instead of wire rope. Tension ties of this form are not resilient but their use still provides a resilient absorption of lengthwise shocks since the tipping of the tension ties out of the vertical, which occurs on longitudinal movements of the trailer on the railway car, tends to draw the trailer body nearer to the car frame and thus stresses the suspension springs of the trailer. Conversely, resilient ties $40^2$ such as those shown in FIGS. 23 may be relied on as the means to give vertical resilience, thus permitting the flanged wheels of the trailer to be rigidly, instead of resiliently, connected to the chassis. They may, for example, be mounted like the front wheels of the tractor shown in FIGS. 8 and 11.

Instead of using small rear flanged wheels 25 for the trailer as shown in FIG. 3, the trailer may be provided with rear flanged wheels $25^1$ rotatably mounted on its rear axle, as shown in FIG. 16.

Instead of using a laterally movable guide in the centering device, the guide of the centering device may be pivoted at its larger end, as shown in FIG. 24.

Instead of mounting the centering device on a short railway flat car as shown in FIGS. 8 and 9, the centering device may be mounted on a platform at the end of the railway track as shown in FIG. 25, or it may be mounted on the ground and connected to the end of the track on the train by an inclined track also mounted on the ground as shown in FIG. 26.

Instead of making the guide 73 of the centering device movable, the guide $73^1$ may be fixed in a central position and mounted over a slidable platform $79^1$ for the road wheels of the vehicle as shown in FIGS. 27 and 28.

The trailers used in the system may have two rear axles 23a, 23b instead of one as shown in FIG. 1. In this case, each of the rear axles is provided with a pair of flanged wheels 25, and the guide 73' of the centering device and its inclined tracks 74 are made somewhat longer than shown in FIGS. 8, 12 and 13 so that the flanged wheels 25 on the first axle 23a are still supported by the guide 73' of the centering device at the time when the flanged wheels on the second axle 23b raise the road wheels of this axle off the floor 79 under the guide, as shown in FIG. 29.

Referring now to FIGS. 30 and 31, a modified form of the railway skeleton car 110 is there illustrated that comprises a longitudinally extending frame 112 that is carried at the opposite ends thereof by a pair of four-wheeled trucks 111 cooperating with the rails 114 of an associated standard gauge railway track. As illustrated, the frame 112 of the car 110 essentially comprises a pair of longitudinally extending and laterally spaced-apart I-beams 113 that are suitably tied together by a number of laterally extending and longitudinally spaced-apart cross members 115, each of which may comprise a short I-beam section, as best illustrated in FIG. 30. Of course, the opposite ends of the frame 112 are provided with the usual laterally extending body bolsters 116 that are pivotally connected to the usual truck bolsters 117 of the trucks 111 by center pins, not shown, so as to accommodate articulation of the trucks 111 with respect to the opposite ends of the frame 112. In the arrangement of the frame 112, the I-beams 113 are suitably welded, or otherwise secured, to the cross members 115 so as to provide a center sill of the required rigidity; and in the opposite ends of the center sill, the usual couplers 118 are mounted for the draft purpose. In the construction, the upper flanges 119 of the I-beams 113 constitute the rails of a narrow gauge track and cooperate with the pair of inwardly facing flanged wheels or rollers, indicated at 120, that are mounted upon the associated rolling freight-carrying body or container, not shown, for the guiding and supporting purposes previously explained.

Thus, in the railway car 110, the longitudinally extending center sill, consisting of the two I-beams 113, interconnects the trucks 111 and comprises the only draft connection therebetween; and the center sill is substantially narrower than the trucks 111, so that the sides of the center sill are disposed well inwardly with respect to the adjacent sides of the trucks 111, and so that the rails 119 of the narrow gauge track, cooperating with the inwardly facing flanged rollers 120, are disposed well inwardly with respect to the adjacent outwardly facing flanged rail wheels 121 of the trucks 111.

Again referring to FIG. 31 of the drawings, a road bed carries the rails 114 of the main railway track that supports the large wheels 121, so that these wheels 121 are referred to as the "main rail wheels." Now the frame 112 of the railway car 110 provides the rails 119 of the track that supports the small wheels 120, whereby it is convenient to refer to this track as the "auxiliary track" and to refer to these wheels 120 as "rollers." The main rail wheels 121 are flanged at the inner edges thereof, and are commonly described as being "outwardly facing flanged wheels." Since the rollers 120 are flanged at the outer edges thereof, it is thus logical to described them as being "inwardly facing flanged rollers." Accordingly, in the appended claims, the expression "inwardly facing flanged rollers" simply means that the rollers carry flanges on the outer edges thereof so that the rollers face inwardly, and thus face oppositely from that of the main rail wheels.

The system of freight transportation disclosed herein is claimed in the copending application of Etienne de Grandpre, Serial No. 747,724, filed July 10, 1958, now Patent No. 3,033,129; the railway car disclosed herein is claimed in the copending application of Etienne de Grandpre, Serial No. 70,524, filed November 21, 1960; and the combination road and railway tractors disclosed herein are claimed in the copending application of Etienne de Grandpre, Serial No. 168,298, filed January 2, 1962.

In view of the foregoing, it is apparent that there has been provided an improved and exceedingly fast system of freight transportation involving both a railway transportion element and a highway transportation element; and furthermore, it will be appreciated that while the freight carriers that have been illustrated and described are of the highway trailer type, such construction is not in any way critical, as these freight carriers may take the form of fully motorized highway trucks, or of pallets or platforms, or of containers or boxes of the less-than-carload types, etc. In any case, the rolling freight carriers may be readily loaded, transported and unloaded with respect to the train of railway skeleton cars in a simple and ready manner, so as to facilitate handling thereof between two or more transportation systems of different types.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A combination road and railway trailer comprising a body having a rear axle provided with rear road wheels and a front landing gear provided with front supporting wheels, a rear pair of flanged rollers carried by said rear axle and located between said rear road wheels and disposed above the plane of the bottom surfaces of said rear road wheels, and a front pair of flanged rollers carried by said front landing gear and located between said front supporting wheels and disposed above the plane of the bottom surfaces of said front supporting wheels, the flanges respectively carried by said rollers being respectively disposed on the outer sides thereof, whereby said two pairs of rollers are inwardly facing and are adapted to straddle and to track the opposite top sides of the frame of a railway car with said rear road wheels in overhanging relation therewith when said trailer is mounted thereon.

2. A combination road and railway trailer comprising a body having rear road wheels and rear flanged rollers located at a level above said rear road wheels, a pair of front flanged rollers, means mounting said front rollers upon said body for movement between an upper position in which they are on a level with said rear rollers and a lower position in which they are on a level with said rear road wheels, the flanges respectively carried by said rollers being respectively disposed on the outer sides thereof, whereby said two pairs of rollers are inwardly facing and are adapted to straddle and to track the opposite top sides of the frame of a railway car with said rear road wheels in overhanging relation therewith when said trailer is mounted thereon with said front rollers in their upper position, and means acting between said body and said mounting when said front rollers are in their upper position for cushioning relative movements between the frame of the railway car and the front of said trailer in its mounted position thereon.

3. The combination road and railway trailer set forth in claim 2, wherein said cushioning means includes a torsion bar interconnecting said body and said mounting.

References Cited in the file of this patent

UNITED STATES PATENTS

| | | |
|---|---|---|
| 352,306 | Dickinson | Nov. 9, 1886 |
| 461,680 | Hunt | Oct. 20, 1891 |
| 490,598 | Huston | Jan. 24, 1893 |
| 789,750 | Messler | May 16, 1905 |
| 880,833 | Stevens | Mar. 3, 1908 |
| 1,709,248 | Ybarrondo | Apr. 16, 1929 |
| 1,926,695 | Hutton | Sept. 12, 1933 |
| 1,937,532 | Ronk | Dec. 5, 1933 |
| 2,889,785 | Browne | June 9, 1959 |
| 2,944,492 | Clejan | July 12, 1960 |
| 2,960,043 | Clejan | Nov. 15, 1960 |
| 2,981,209 | Flemming | Apr. 25, 1961 |

FOREIGN PATENTS

| | | |
|---|---|---|
| 688,088 | Great Britain | Feb. 25, 1953 |